(12) United States Patent
Kum et al.

(10) Patent No.: US 11,448,919 B2
(45) Date of Patent: Sep. 20, 2022

(54) DISPLAY DEVICE

(71) Applicant: Samsung Display Co., LTD., Yongin-si (KR)

(72) Inventors: Byung Gon Kum, Yongin-si (KR); Tae Gil Kang, Yongin-si (KR); Seul Lee, Yongin-si (KR)

(73) Assignee: Samsung Display Co., LTD., Yongin-si (KR)

( * ) Notice: Subject to any disclaimer, the term of this patent is extended or adjusted under 35 U.S.C. 154(b) by 0 days.

(21) Appl. No.: 16/941,417

(22) Filed: Jul. 28, 2020

(65) Prior Publication Data

US 2021/0149246 A1    May 20, 2021

(30) Foreign Application Priority Data

Nov. 14, 2019   (KR) .................. 10-2019-0145750

(51) Int. Cl.
*G02F 1/1335* (2006.01)

(52) U.S. Cl.
CPC .. *G02F 1/133528* (2013.01); *G02F 1/133514* (2013.01); *G02F 2201/501* (2013.01)

(58) Field of Classification Search
CPC ......... G02F 1/133528; G02F 1/133514; G02F 2201/501; G02F 1/133388; G02F 1/133512; G02F 1/133531; G02F 1/133509; G02F 1/133536; G02F 1/1335; G02F 1/133305; G06F 1/1616; G06F 1/1618; G06F 1/162; G06F 1/1641; G06F 1/1652; G06F 2203/04102
See application file for complete search history.

(56) References Cited

U.S. PATENT DOCUMENTS

| | | | |
|---|---|---|---|
| 6,646,697 B1* | 11/2003 | Sekiguchi | G02F 1/13471 |
| | | | 349/73 |
| 9,759,950 B2 | 9/2017 | Kim et al. | |
| 2018/0292708 A1* | 10/2018 | Huang | G02F 1/13454 |
| 2019/0212594 A1* | 7/2019 | Chen | G02F 1/1368 |

FOREIGN PATENT DOCUMENTS

| | | |
|---|---|---|
| KR | 10-0955762 | 4/2010 |
| KR | 10-2014-0095621 | 8/2014 |
| KR | 10-1941440 | 1/2019 |

* cited by examiner

*Primary Examiner* — Phu Vu
(74) *Attorney, Agent, or Firm* — H.C. Park & Associates, PLC

(57) ABSTRACT

A display device includes a first substrate including a display area and a non-display area, a second substrate disposed on the first substrate, a liquid crystal layer disposed between one surface of the first substrate and one surface of the second substrate, a first polarizing plate disposed on the other surface of the first substrate and having one end disposed inside one end of the first substrate, a second polarizing plate disposed on the other surface of the second substrate and having one end disposed inside one end of the second substrate, a first polarizing coating layer overlapping the one end of the first polarizing plate, and a second polarizing coating layer overlapping the one end of the second polarizing plate.

19 Claims, 8 Drawing Sheets

DISPLAY DEVICE

CROSS REFERENCE TO RELATED APPLICATION

This application claims priority from and the benefit of Korean Patent Application No. 10-2019-0145750, filed Nov. 14, 2019, which is hereby incorporated by reference for all purposes as if fully set forth herein.

BACKGROUND

Field

Exemplary embodiments of the invention relate generally to a display device.

Discussion of the Background

The importance of display devices is increasing with the development of multimedia. In response to this, various types of display devices, such as a liquid crystal display (LCD) device and an organic light emitting display (OLED) device, are used.

As one of the flat panel display devices that is widely used, the liquid crystal display device includes two substrates on which field generating electrodes such as a pixel electrode and a common electrode are formed, and a liquid crystal layer interposed therebetween. In the liquid crystal display device, when a voltage is applied to the field generating electrode, an electric field is generated in the liquid crystal layer, whereby a direction of liquid crystal molecules of the liquid crystal layer is determined, and polarization of incident light is controlled to display an image.

The liquid crystal display device generally includes a display area in which the image is displayed and a non-display area in which various signal lines for displaying the image are disposed. Recently, in order to implement the liquid crystal display device having a narrow bezel, the non-display area has been gradually narrowing.

The above information disclosed in this Background section is only for understanding of the background of the inventive concepts, and, therefore, it may contain information that does not constitute prior art.

SUMMARY

Devices constructed according to exemplary embodiments of the invention can provide a display device capable of minimizing a dead space and preventing or reducing viewing angle light leakage.

Additional features of the inventive concepts will be set forth in the description which follows, and in part will be apparent from the description, or may be learned by practice of the inventive concepts.

A display device according to an exemplary embodiment of the present invention may include a first substrate including a display area and a non-display area; a second substrate disposed on the first substrate; a liquid crystal layer disposed between one surface of the first substrate and one surface of the second substrate; a first polarizing plate disposed on the other surface of the first substrate and having one end disposed inside one end of the first substrate; a second polarizing plate disposed on the other surface of the second substrate and having one end disposed inside one end of the second substrate; a first polarizing coating layer overlapping the one end of the first polarizing plate; and a second polarizing coating layer overlapping the one end of the second polarizing plate.

The first polarizing coating layer may be disposed between the first substrate and the first polarizing plate.

The second polarizing coating layer may be disposed between the second substrate and the second polarizing plate.

One surface of the first polarizing coating layer may be in contact with the first substrate, and the other surface of the first polarizing coating layer may be in contact with the first polarizing plate.

The first polarizing plate may be in contact with the first substrate and the first polarizing coating layer.

The first polarizing plate may directly cover one end of the first polarizing coating layer.

A first end of the first polarizing coating layer may be disposed in the display area, and a second end of the first polarizing coating layer may be aligned with the one end of the first substrate.

The first polarizing coating layer and the second polarizing coating layer may include the same material.

A thickness of the first polarizing plate may be greater than that of the first polarizing coating layer.

The first polarizing coating layer may be disposed between the first substrate and the liquid crystal layer.

The first polarizing coating layer may be in direct contact with the one surface of the first substrate.

The second polarizing coating layer may be disposed between the second substrate and the liquid crystal layer.

The display device may further include a color filter disposed in the display area.

The one end of the first polarizing coating layer and one end of the second polarizing coating layer may overlap the color filter.

The first polarizing coating layer may be disposed at the same level as the color filter.

The display device may further include a light blocking layer disposed in the non-display area.

The first polarizing coating layer and the second polarizing coating layer may overlap the light blocking layer.

The one end of the first polarizing plate and the one end of the second polarizing plate may overlap the light blocking layer.

The light blocking layer may be disposed between the second substrate and the liquid crystal layer.

The light blocking layer may be disposed at the same level as the color filter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION

Figure 1:
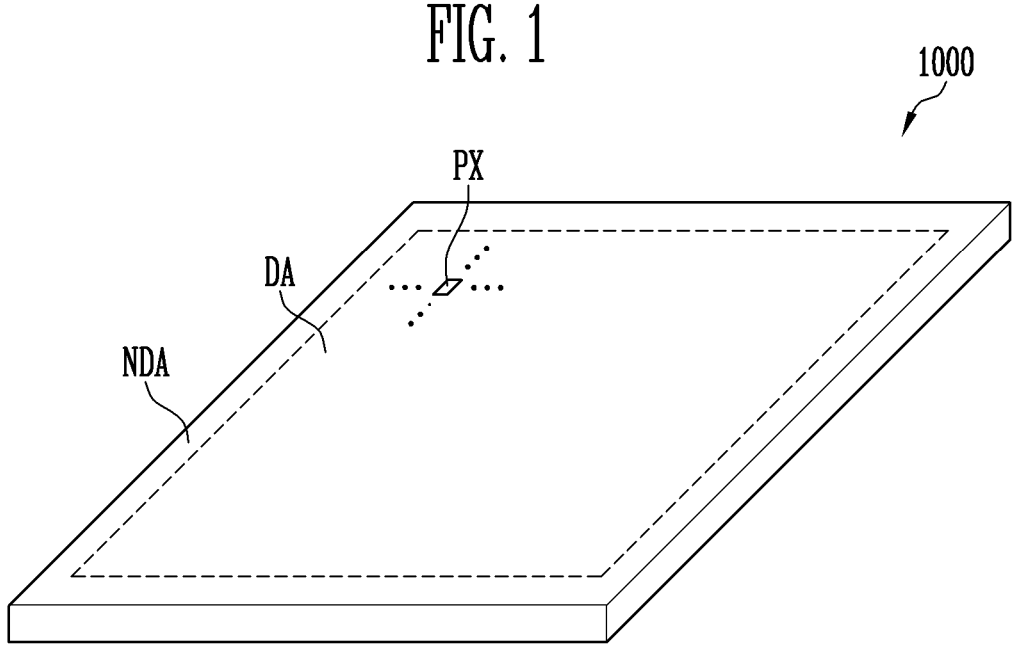
FIG. 1 is a perspective view schematically illustrating a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a perspective view schematically illustrating a display device according to an exemplary embodiment.

In the present disclosure, the terms "on", "top", "top surface", and "upper surface" may refer to an upper direction, that is, a Z-axis direction with respect to a display device 1000, and the terms "below", "bottom", "bottom surface", and "lower surface" may refer to a lower direction, that is, a direction opposite to the Z-axis direction, with respect to the display device 1000. In addition, the terms "left", "right", "up" and "down" may refer to directions when the display device 1000 is viewed from a plane. For example, "left" refers to a direction opposite to an X-axis direction, "right" refers to the X-axis direction, "up" refers to a Y-axis direction, and "down" refers to a direction opposite to the Y-axis direction.

Referring to FIG. 1, the display device 1000 may be applied to various electronic devices including small and medium-sized electronic devices such as a tablet PC, a smartphone, a car navigation unit, a camera, a center information display (CID) provided to an automobile, a wristwatch-type electronic device, a personal digital assistant (PDA), a portable multimedia player (PMP), and a game console, and medium and large-sized electronic devices such as a television, an external billboard, a monitor, a personal computer, and a notebook computer. These are just presented as embodiments, and of course, may be employed in other electronic devices without departing from the concepts of the present invention.

The display device 1000 may have a rectangular shape in a plane view. The display device 1000 may include edges with both short sides extending in one direction and both long sides extending in another direction crossing the one direction. Corner portions where the long sides and the short sides of the display device 1000 meet on a plane may be perpendicular. However, the present invention is not limited thereto, and the corner portions may have a rounded curved shape. The shape of the display device 1000 in the plan view is not limited to the above examples, and may have a square, a circular shape, an ellipse, or other shapes.

The display device 1000 may include a display area DA displaying an image and a non-display area NDA outside of the display area DA.

The display area DA may be an area where a plurality of pixels PX are provided. The display area DA may be disposed on a front surface or a side surface of the display device 1000.

The non-display area NDA may be an area in which driving units for driving the plurality of pixels PX and various wiring units (not shown) connecting the plurality of pixels PX and the driving unit are provided. The non-display area NDA may be disposed on at least one side of the display area DA. For example, the non-display area NDA may be disposed to surround the display area DA.

The plurality of pixels PX may be provided in the display area DA. Each of the plurality of pixels PX may emit one of red, green, and blue colors, but the present invention is not limited thereto. For example, each of the plurality of pixels PX may emit any one color of cyan, magenta, yellow, and white.

The plurality of pixels PX may be arranged in a matrix form, forming rows and columns along a first direction (X-axis direction) and a second direction (Y-axis direction) intersecting the first direction (X-axis direction). However, the arrangement of the plurality of pixels PX is not limited thereto, and may be modified in various forms.

Figure 2:
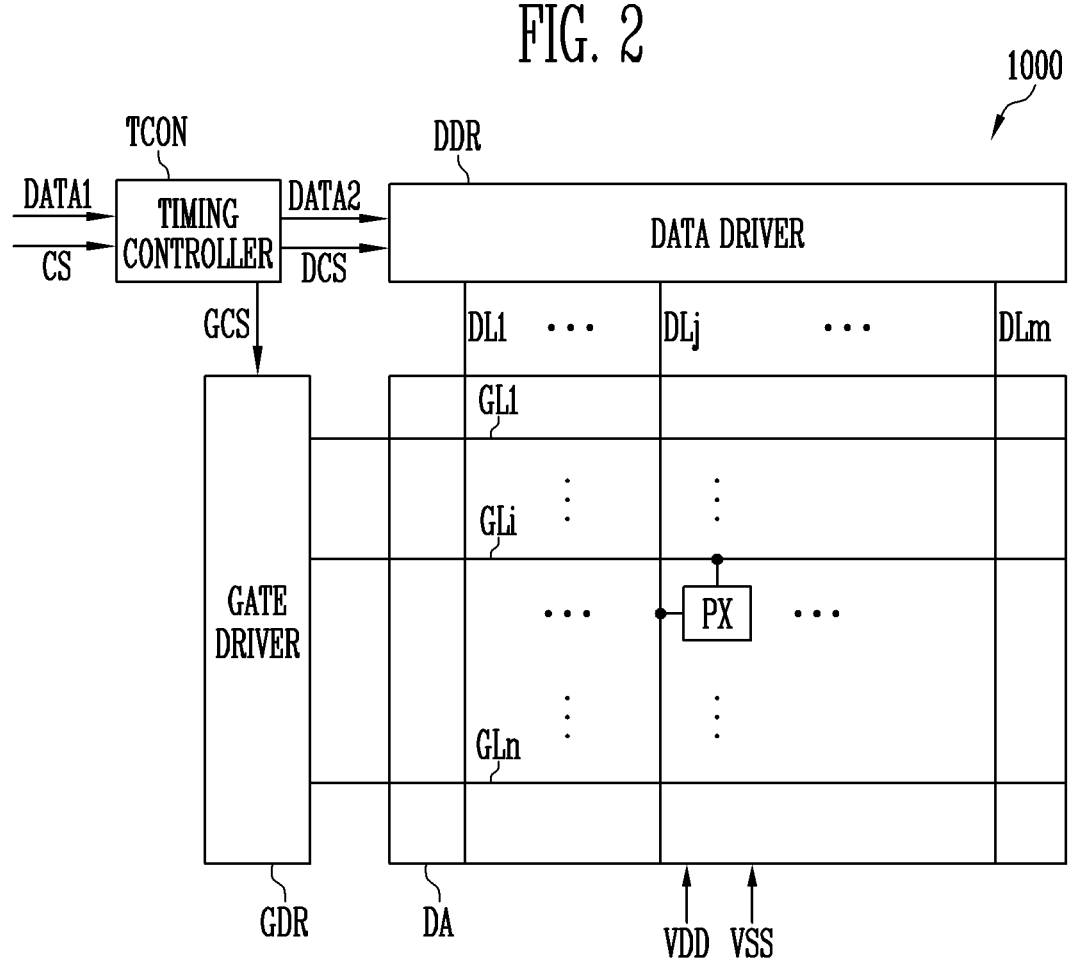
FIG. 2 is a schematic block diagram of the display device according to the exemplary embodiment.

FIG. 2 is a schematic block diagram of the display device according to the exemplary embodiment.

Referring to FIG. 2, the display device 1000 may include a gate driver GDR, a data driver DDR, and a timing controller TCON.

The plurality of pixels PX may be positioned at intersections of a plurality of scan lines GL1 to GLn and a plurality of data lines DL1 to DLm to form the matrix, where n and m are positive integers. Each of the plurality of pixels PX may be connected to at least one of the scan lines GL1 to GLn and at least one of the data lines DL1 to DLm.

The plurality of scan lines GL1 to GLn may extend in a row direction, and the plurality of data lines DL1 to DLm may extend in a column direction. The row direction and the column direction may be interchanged.

First and second power sources VDD and VSS may be provided to each of the plurality of pixels PX. The first and second power sources VDD and VSS are voltages required to operate the pixels PX, and the first power source VDD may have a voltage level higher than that of the second power source VSS.

The gate driver GDR may receive a gate driving control signal GCS such as a scan start signal and a clock signal from the timing controller TCON. The gate driver GDR may further receive a third power source and a fourth power source required to operate the gate driver GDR. For example, the third power source may be a voltage having a logic high level, and the fourth power source may be a voltage having a logic low level.

The gate driver GDR may generate a scan signal and sequentially provide the scan signal to the scan lines GL1 to GLn. The gate driver GDR may include a shift register (or stage) that sequentially generates and outputs the scan signal having a pulse shape corresponding to the scan start signal having the pulse shape using the clock signal of the gate driving control signal GCS. The scan signal having the pulse shape generated by the gate driver GDR may be applied to each pixel PX.

The data driver DDR may generate data signals based on image data DATA2 and a data control signal DCS provided from the timing controller TCON, and provide the data signals to the pixels PX. Here, the data control signal DCS may be a signal for controlling an operation of the data driver DDR, and may include a load signal (or a data enable signal) indicating an output of a valid data signal. Each pixel PX may receive a data signal through the data lines DL1 through DLm, and emit light at a luminance corresponding to the data signal.

The timing controller TCON may receive input image data DATA1 and a control signal CS from an external device (for example, a graphic processor), generate the gate driving control signal GCS and the data control signal DCS based on the control signal CS, and convert the input image data DATA1 to generate the image data DATA2.

Figure 3:
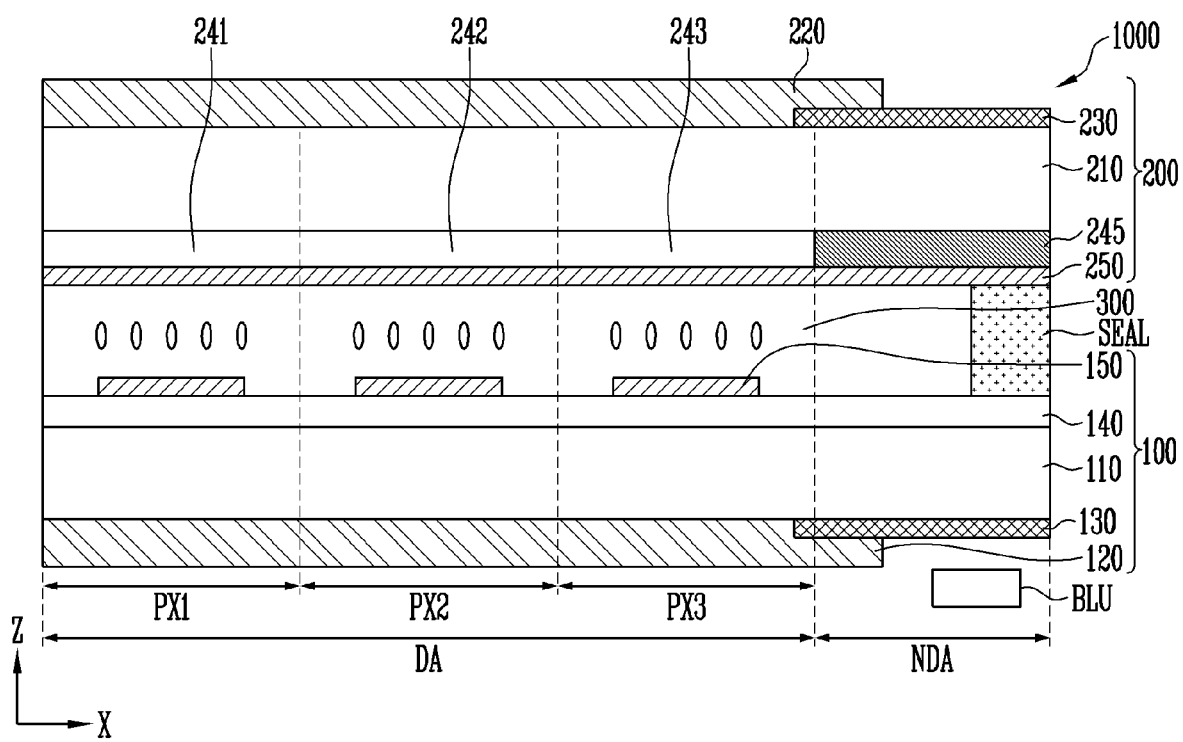
FIG. 3 is a cross-sectional view of the display device according to the exemplary embodiment.
Figure 4:
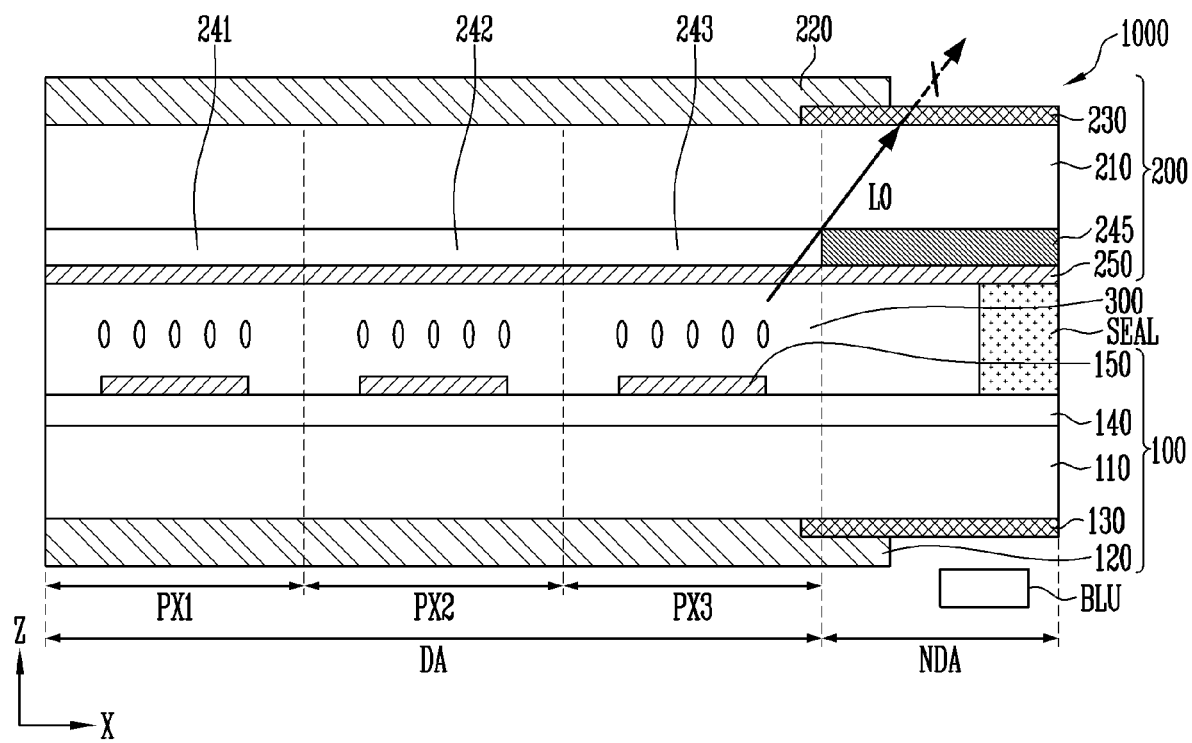
FIG. 4 is a cross-sectional view illustrating a path of light emitted to a side of the display device of FIG. 3.

FIG. 3 is a cross-sectional view of the display device according to the exemplary embodiment. FIG. 4 is a cross-sectional view illustrating a path of light emitted to a side of the display device of FIG. 3.

Referring to FIGS. 3 and 4, the display device 1000 may include a first display substrate 100, a second display substrate 200, and a liquid crystal layer 300.

The first display substrate 100 may include a first substrate 110, a first polarizing plate 120, a first polarizing coating layer 130, a circuit element layer 140, and first electrodes 150.

The first substrate 110 may include the display area DA and the non-display area NDA. A plurality of pixels PX1, PX2, and PX3 may be defined in the display area DA of the first substrate 110. Each of the plurality of pixels PX1, PX2, and PX3 may emit light of different colors. For example, a first pixel PX1 may be a red pixel that emits red light, a second pixel PX2 may be a green pixel that emits green light, and a third pixel PX3 may be a blue pixel that emits blue light. However, the color of light emitted from each of the first, second, and third pixels PX1, PX2, and PX3 is not necessarily limited thereto. In another exemplary embodiment, the first, second, and third pixels PX1, PX2, and PX3 may emit light of yellow, magenta, and cyan colors, respectively.

The first substrate 110 may be made of a light transmitting material. The first substrate 110 may be a glass substrate or a plastic substrate. When the first substrate 110 is a plastic substrate, the first substrate 110 may have flexibility.

The first polarizing plate 120 may be disposed under the first substrate 110. One end of the first polarizing plate 120 may be disposed inside one end of the first substrate 110.

The first polarizing plate 120 may be disposed in the display area DA and partially overlap the non-display area NDA. The first polarizing plate 120 may overlap a light blocking layer 245 to be described later in a third direction (Z-axis direction).

The first polarizing plate 120 may be directly disposed on a bottom surface of the first substrate 110. That is, the first polarizing plate 120 may be in contact with the first substrate 110.

The first polarizing plate 120 may be a reflective polarizer. The first polarizing plate 120 may transmit light of a polarization component parallel to a polarization axis, but absorb or reflect light of another polarization component.

The first polarizing coating layer 130 may be disposed on the first substrate 110. The first polarizing coating layer 130 may be disposed between the first substrate 110 and the first polarizing plate 120.

The first polarizing coating layer 130 may prevent or reduce viewing angle light leakage in which light from a backlight BLU in the non-display area NDA unintentionally travels to the display area DA.

The first polarizing coating layer 130 may be disposed in the non-display area NDA and partially overlap the display area DA. The first polarizing coating layer 130 may be disposed to overlap the light blocking layer 245 to be described later in the third direction (Z-axis direction).

A first end of the first polarizing coating layer 130 may be disposed in the display area DA, and a second end of the first polarizing coating layer 130 may be aligned with the one end of the first substrate 110. Accordingly, even if the one end of the first polarizing plate 120 is disposed inside the one end of the first substrate 110, the viewing angle light leakage can be prevented or reduced. The first end of the first polarizing coating layer 130 may be directly covered by the first polarizing plate 120.

Meanwhile, even if the first polarizing coating layer 130 partially invades the display area DA, generation of a dark portion may be minimized due to polarization. For example, if a blocking layer including black ink is used instead of the first polarizing coating layer 130, the dark portion may occur in the display area DA. In addition, even if the first polarizing coating layer 130 partially invades the display area DA, since there is no significant effect on the display quality, a coating process of the first polarizing coating layer 130 may be facilitated, and manufacturing yield of the product may be increased by lowering a criterion of the defective rate.

One surface of the first polarizing coating layer 130 may be in contact with the first substrate 110, and the other surface of the first polarizing coating layer 130 may be in contact with the first polarizing plate 120.

A thickness of the first polarizing coating layer 130 may be different from that of the first polarizing plate 120. For example, the thickness of the first polarizing coating layer 130 may be smaller than that of the first polarizing plate 120. The polarization axis of the first polarizing coating layer 130 may be substantially the same as that of the first polarizing plate 120.

The first polarizing coating layer 130 may be, for example, a thin crystal film polarizer. The thin crystal film polarizer may have a special molecular crystal structure formed as a result of crystallization of liquid crystal phase when liquid crystal is applied, aligned and dried on a thin film. The liquid crystal phase may include at least one organic material capable of forming a stable concentration transition type liquid crystal phase or a stable temperature transition type liquid crystal phase.

The circuit element layer 140 may be disposed on the first substrate 110. The circuit element layer 140 may be disposed over the first substrate 110. That is, the first substrate 110 may be disposed between the circuit element layer 140 and the first polarizing plate 120.

The circuit element layer 140 may be disposed in the display area DA and the non-display area NDA. The circuit element layer 140 may include a plurality of circuit elements constituting a pixel circuit of the plurality of pixels PX1, PX2, and PX3 and wirings for supplying various power sources and signals to drive the plurality of pixels PX1, PX2, and PX3. In this case, the circuit element layer 140 may include various circuit elements such as at least one transistor and a capacitor, and a plurality of conductive layers for forming the wirings connected thereto. In addition, the circuit element layer 140 may include an insulating layer disposed between the plurality of conductive layers. In addition, the circuit element layer 140 may include a wiring unit disposed in the non-display area NA to supply corresponding power sources and signals to the wirings connected to the plurality of pixels PX1, PX2, and PX3.

A plurality of first electrodes 150 may be disposed on the circuit element layer 140. Each of the plurality of first electrodes 150 may be disposed in the plurality of pixels PX1, PX2, and PX3. Each of the plurality of first electrodes 150 may be electrically connected to transistors of the circuit element layer 140.

Each of the first electrodes 150 may be made of transparent conductive oxide. For example, each of the first electrodes 150 may include indium tin oxide (ITO), indium zinc oxide (IZO), zinc oxide (ZnO), indium oxide ($In_2O_3$), or the like.

The second display substrate 200 may be disposed over the first display substrate 100.

The second display substrate 200 may include a second substrate 210, a second polarizing plate 220, a second polarizing coating layer 230, color filters 241, 242, and 243, a light blocking layer 245, and a second electrode 250.

The second substrate 210 may include the display area DA and the non-display area NDA. The plurality of pixels PX1, PX2, and PX3 may be defined in the display area DA of the second substrate 210.

The second substrate 210 may be made of the light transmitting material. The second substrate 210 may be the glass substrate or the plastic substrate. When the second substrate 210 is the plastic substrate, the second substrate 210 may have flexibility.

The second polarizing plate 220 may be disposed on the second substrate 210. One end of the second polarizing plate 220 may be disposed inside one end of the second substrate 210.

The second polarizing plate 220 may be disposed in the display area DA and partially overlap the non-display area NDA. The second polarizing plate 220 may overlap the light blocking layer 245 to be described later in the third direction (Z-axis direction).

The second polarizing plate 220 may be directly disposed on a bottom surface of the second substrate 210. That is, the second polarizing plate 220 may be in contact with the second substrate 210.

The second polarizing plate 220 may be the reflective polarizer. The second polarizing plate 220 may transmit light of a polarization component parallel to a polarization axis, but absorb or reflect light of another polarization component. The polarization axis of the second polarizing plate 220 may cross that of the first polarizing plate 120.

The second polarizing coating layer 230 may be disposed on the second substrate 210. The second polarizing coating layer 230 may be disposed between the second substrate 210 and the second polarizing plate 220.

The second polarizing coating layer 230 may be disposed in the non-display area NDA and partially overlap the display area DA. The second polarizing coating layer 230 may be disposed to overlap the light blocking layer 245 to be described later in the third direction (Z-axis direction).

The second polarizing coating layer 230 may block light traveling from the pixels PX1, PX2, and PX3 to the non-display area NDA to prevent or reduce the viewing angle light leakage.

A first end of the second polarizing coating layer 230 may be disposed in the display area DA, and a second end of the second polarizing coating layer 230 may be aligned with the one end of the second substrate 210. Accordingly, even if the one end of the second polarizing plate 220 is disposed inside the one end of the second substrate 210, the viewing angle light leakage can be prevented or reduced. The first end of the second polarizing coating layer 230 may be directly covered by the second polarizing plate 220.

Meanwhile, even if the second polarizing coating layer 230 partially invades the display area DA, generation of a dark portion may be minimized due to polarization. For example, if a blocking layer including black ink is used instead of the second polarizing coating layer 230, the dark portion may occur in the display area DA. In addition, even if the second polarizing coating layer 230 partially invades the display area DA, since there is no significant effect on the display quality, a coating process of the second polarizing coating layer 230 may be facilitated, and manufacturing yield of the product may be increased by lowering a criterion of the defective rate.

One surface of the second polarizing coating layer 230 may be in contact with the second substrate 210, and the other surface of the second polarizing coating layer 230 may be in contact with the second polarizing plate 220.

A thickness of the second polarizing coating layer 230 may be different from that of the second polarizing plate 220. For example, the thickness of the second polarizing coating layer 230 may be smaller than that of the second polarizing plate 220. The polarization axis of the second polarizing coating layer 230 may be substantially the same as that of the second polarizing plate 220.

The second polarizing coating layer 230 may be made of the same material as the first polarizing coating layer 130 described above, but the present invention is not necessarily limited thereto.

The color filters 241, 242, and 243 and the light blocking layer 245 may be disposed under the second substrate 210. The color filters 241, 242, and 243 may be disposed between the second substrate 210 and the liquid crystal layer 300 to be described later.

The color filters 241, 242, and 243 may be disposed in the display area DA. The color filters 241, 242, and 243 may overlap the one end of the first polarizing coating layer 130 and the one end of the second polarizing coating layer 230 in the third direction (Z-axis direction). In detail, the first end of the first polarizing coating layer 130 may be disposed in the display area DA to overlap the color filters 241, 242, and 243 in the third direction (Z-axis direction). The second end of the first polarizing coating layer 130 may be aligned with the one end of the first substrate 110. The first end of the second polarizing coating layer 230 may be disposed in the display area DA to overlap the color filters 241, 242, and 243 in the third direction (Z-axis direction). The second end of the second polarizing coating layer 230 may be aligned with the one end of the second substrate 210.

The color filters 241, 242, and 243 may include a first color filter 241, a second color filter 242, and a third color filter 243.

The first color filter 241 may be disposed to overlap the first pixel PX1, the second color filter 242 may be disposed to overlap the second pixel PX2, and the third color filter 243 may be disposed to overlap the third pixel PX3.

Each of the color filters 241, 242, and 243 may selectively transmit light of a specific color, but may absorb light of different colors to block their progress.

For example, the first color filter 241 may selectively transmit light of a first color (for example, red light) and block or absorb light of a second color (for example, green light) and light of a third color (for example, blue light). The first color filter 241 may be a red color filter, and may include a red color material such as a red dye or a red pigment. In the present disclosure, a colorant may be understood as a concept including both the dye and the pigment.

In addition, the second color filter 242 may selectively transmit the light of the second color (for example, green light) and block or absorb the light of the first color (for example, red light) and the light of the third color (for example, blue light). The second color filter 242 may be a green color filter, and may include a green color material such as a green dye or a green pigment.

In addition, the third color filter 243 may selectively transmit the light of the third color (for example, blue light) and block or absorb the light of the first color (for example, red light) and the light of the second color (for example, green light). The third color filter 243 may be a blue color filter, and may include a blue color material such as a blue dye or a blue pigment.

FIGS. 3 and 4 illustrate a structure in which the first to third color filters 241, 242, and 243 do not overlap each other, but the present invention is not limited thereto. For example, the first to third color filters 241, 242, and 243 may partially overlap each other at a boundary between the first to third pixels PX1, PX2, and PX3.

The light blocking layer 245 may be disposed in the non-display area NDA. The light blocking layer 245 may overlap the first polarizing coating layer 130 and the second polarizing coating layer 230 in the third direction (Z-axis direction). In addition, the light blocking layer 245 may overlap the one end of the first polarizing plate 120 and the one end of the second polarizing plate 220 in the third direction (Z-axis direction).

The light blocking layer 245 may block light traveling to the display area DA unintentionally from the backlight BLU of the non-display area NDA and light traveling from the pixels PX1, PX2, and PX3 to the non-display area NDA. Therefore, the viewing angle light leakage can be prevented or reduced. In addition, the light blocking layer 245 may absorb external light, thereby reducing color distortion due to reflection of the external light.

As the light blocking layer 245 extends in a direction opposite to the first direction (X-axis direction), the light traveling to the display area DA unintentionally from the backlight BLU of the non-display area NDA and the light traveling from the pixels PX1, PX2, and PX3 to the non-display area NDA can be easily blocked. Therefore, the effect of preventing or reducing the viewing angle light leakage can be increased. On the other hand, when the light blocking layer 245 extends too far in the direction opposite to the first direction (X-axis direction), since the dark portion may be generated in the display area DA, the extension length of the light blocking layer 245 may be limited. Therefore, the viewing angle light leakage may be difficult to be completely prevented by the light blocking layer 245 alone.

The light blocking layer 245 may be formed of an organic material including at least one of, for example, graphite, carbon black, black pigment, and black dye, or may be formed of a metal material including chromium (Cr). However, any material that can block or absorb light transmission is not limited. The light blocking layer 245 may be disposed at the same level as the color filters 241, 242, and 243.

Although not shown in FIGS. 3 and 4, a planarization layer may be further disposed under the color filters 241, 242, and 243 and the light blocking layer 245. The planarization layer may serve to alleviate the step formed by the color filters 241, 242, and 243 and the light blocking layer 245.

The second electrode 250 may be disposed under the color filters 241, 242, and 243 and the light blocking layer 245. When the planarization layer is further disposed under the color filters 241, 242, and 243 and the light blocking layer 245, the second electrode 250 may be disposed under the planarization layer.

The second electrode 250 may be formed in common across the entire surface of the second substrate 210. A common voltage may be applied to the second electrode 250, and the second electrode 250 may form an electric field together with the first electrode 150. In this case, according to the magnitude of the electric field, an arrangement of liquid crystal molecules in the liquid crystal layer 300 may be changed to control transmittance of the light.

The second electrode 250 may transmit all of the light or transmit some of the light. When the second electrode transmits some of the light, the second electrode 250 may be formed of Ag, Mg, Cu, Al, Pt, Pd, Au, Ni, Nd, Ir, Cr, Li, Ca, LiF/Ca, LiF/Al, Mo, Ti, or a compound or mixture thereof, for example, a mixture of Ag and Mg. When the second electrode transmits all of the light, the second electrode 250 may include a transparent conductive oxide (TCO).

A sealing member SEAL may be disposed between the first display substrate 100 and the second display substrate 200. The sealing member SEAL may be disposed in the non-display area NDA. The first display substrate 100 and the second display substrate 200 may be coupled to each other by the sealing member SEAL. The sealing member SEAL may be made of an organic material. For example, the organic material may be an epoxy resin, but the present invention is not limited thereto.

The liquid crystal layer 300 may be disposed inside the sealing member SEAL. The liquid crystal layer 300 may be disposed in a space between the first display substrate 100 and the second display substrate 200 surrounded by the sealing member SEAL.

The liquid crystal layer 300 may include the liquid crystal molecules. When the electric field is formed in the liquid crystal layer 300, the liquid crystal molecules may rotate according to the formed electric field. The transmittance of the light may vary depending on the electric field formed in the liquid crystal layer 300.

The display device 1000 may further include the backlight BLU. The backlight BLU may include a plurality of light sources and emit light toward the first display substrate 100. In an exemplary embodiment, the light sources may be light emitting diodes, but are not limited thereto, and may refer to all components capable of emitting light.

As described above, when the first polarizing coating layer 130 is disposed to overlap the one end of the first polarizing plate 120, and the second polarizing coating layer 230 is disposed to overlap the one end of the second polarizing plate 220, light LO passing through the liquid crystal layer 300 and traveling to the non-display area NDA may be effectively blocked. Therefore, the viewing angle light leakage of the display device 1000 can be prevented or reduced.

In addition, since the viewing angle light leakage can be prevented or reduced by the first polarizing coating layer 130 and the second polarizing coating layer 230, the area where the light blocking layer 245 is disposed may be minimized. Accordingly, since a dead space can be minimized, the display device 1000 having a narrow bezel can be easily implemented.

Hereinafter, other embodiments will be described. In the following embodiments, the same components as the components already described will be referred to by the same reference numerals, and redundant descriptions will be omitted or simplified.

Figure 5:
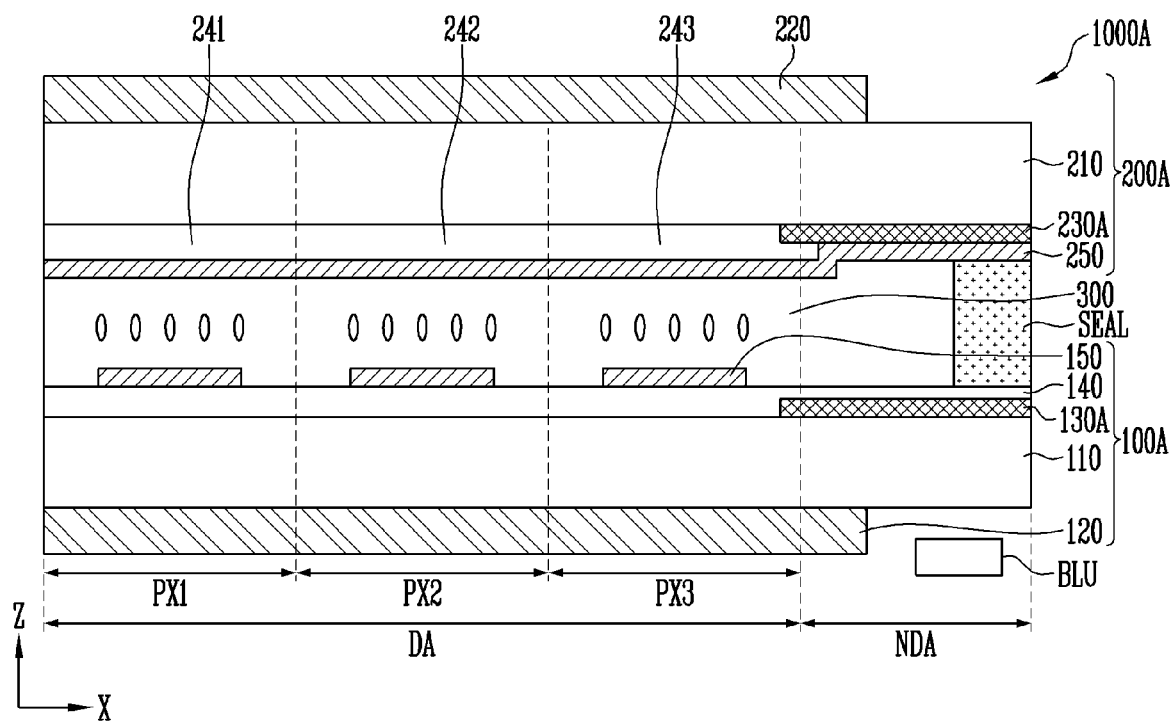
FIG. 5 is a cross-sectional view of a display device according to another exemplary embodiment.
Figure 6:
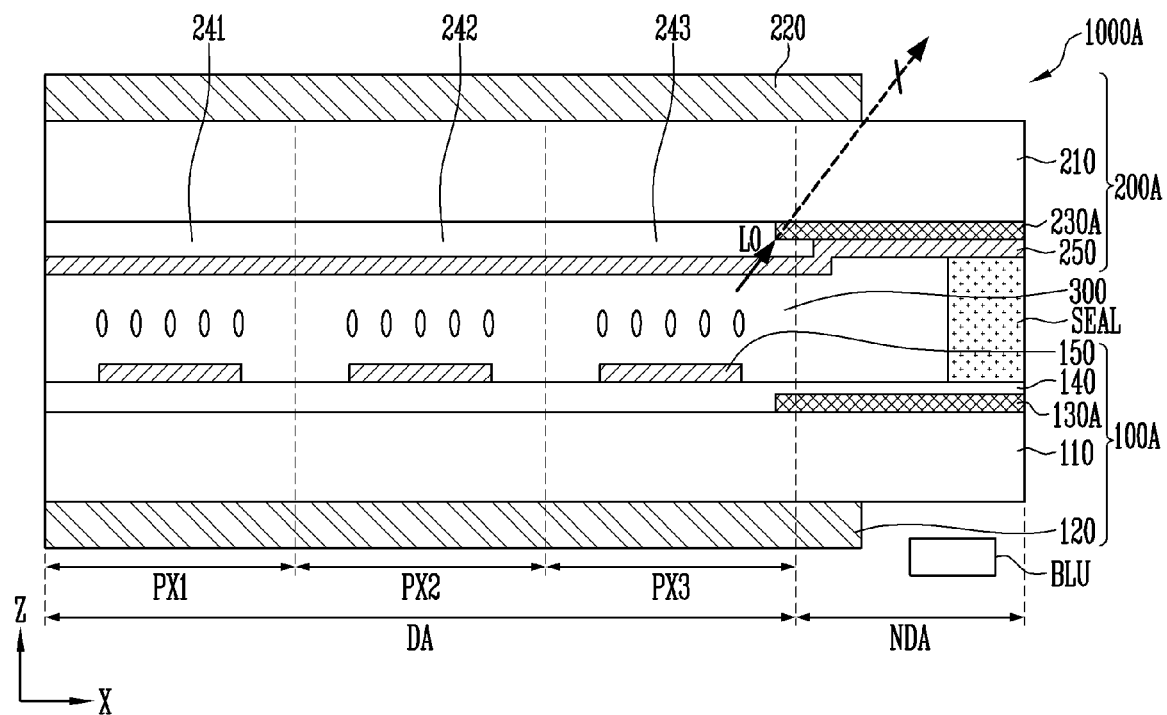
FIG. 6 is a cross-sectional view illustrating a path of light emitted to a side of the display device of FIG. 5.

FIG. 5 is a cross-sectional view of a display device according to another exemplary embodiment. FIG. 6 is a cross-sectional view illustrating a path of light emitted to a side of the display device of FIG. 5.

Referring to FIGS. 5 and 6, compared to the display device 1000 of FIGS. 1 to 4, in a display device 1000A according to the present exemplary embodiment, first and second polarizing coating layers 130A and 230A are disposed between two substrates 110 and 210, and the light blocking layer is omitted.

In detail, the first polarizing coating layer 130A may be disposed between the first substrate 110 and the circuit element layer 140. The first polarizing coating layer 130A may be directly disposed on one surface of the first substrate 110. That is, the first polarizing coating layer 130A may be in direct contact with the one surface of the first substrate 110.

The second polarizing coating layer 230A may be disposed between the second substrate 210 and the second electrode 250. The second polarizing coating layer 230A may be directly disposed on one surface of the second substrate 210. That is, the second polarizing coating layer 230A may be in direct contact with the one surface of the second substrate 210.

A first end of the first polarizing coating layer 130A may be disposed in the display area DA to overlap the color filters 241, 242, and 243 in the third direction (Z-axis direction). A second end of the first polarizing coating layer 130A may be aligned with the one end of the first substrate 110.

A first end of the second polarizing coating layer 230B may be disposed in the display area DA to overlap the color filters 241, 242, and 243 in the third direction (Z-axis direction). The first end of the second polarizing coating layer 230B may be in direct contact with the color filters 241, 242, and 243. The second end of the second polarizing coating layer 230B may be aligned with the one end of the second substrate 210.

As described above, when the first polarizing coating layer 130A and the second polarizing coating layer 230A are disposed in the non-display area NDA, the light blocking layer may be omitted. Therefore, since the dead space can be minimized, the display device 1000A having the narrow bezel can be implemented.

In addition, when the first polarizing coating layer 130A is disposed to overlap the one end of the first polarizing plate 120, and the second polarizing coating layer 230A is disposed to overlap the one end of the second polarizing plate 220, the light L0 passing through the liquid crystal layer 300 and traveling to the non-display area NDA may be effectively blocked. Therefore, as described above, the viewing angle light leakage of the display device 1000A can be prevented or reduced.

Figure 7:
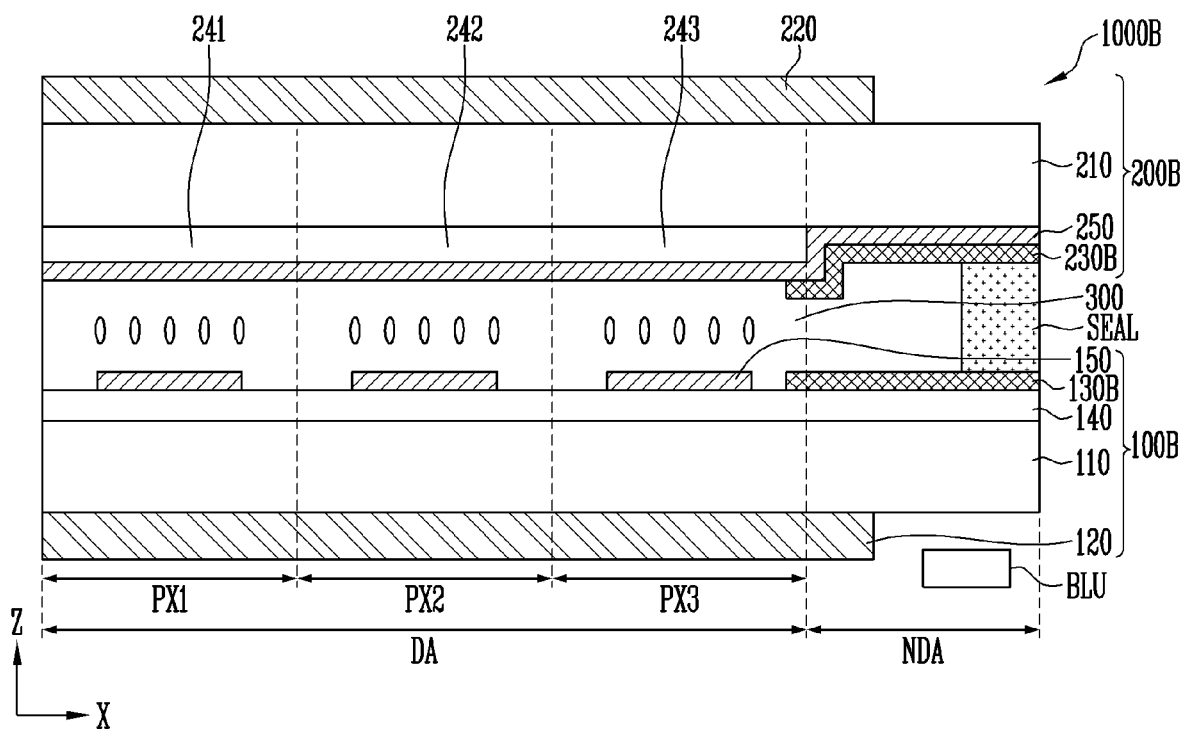
FIG. 7 is a cross-sectional view of a display device according to still another exemplary embodiment.
Figure 8:
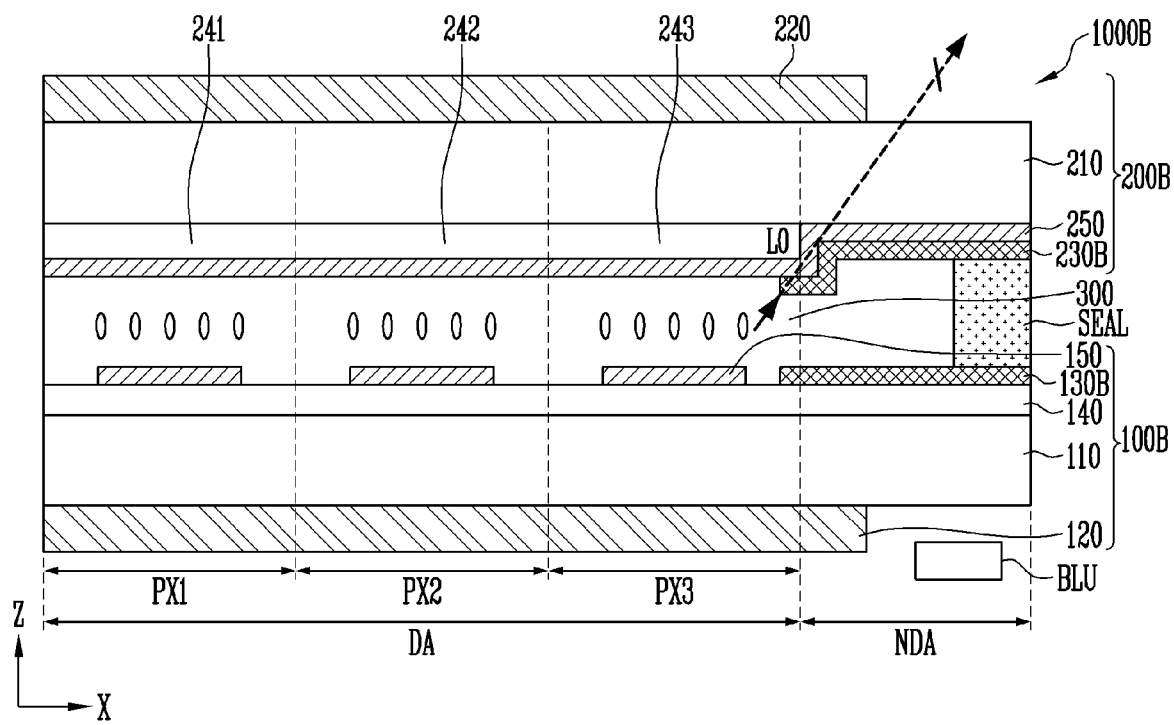
FIG. 8 is a cross-sectional view illustrating a path of light emitted to a side of the display device of FIG. 7.

FIG. 7 is a cross-sectional view of a display device according to still another exemplary embodiment. FIG. 8 is a cross-sectional view illustrating a path of light emitted to a side of the display device of FIG. 7.

Referring to FIGS. 7 and 8, as compared to the display device 1000 of FIGS. 1 to 4, in a display device 1000B according to the present exemplary embodiment, first and second polarizing coating layers 130B and 230B are disposed between two substrates 110 and 210, and the light blocking layer is omitted.

In detail, the first polarizing coating layer 130B may be disposed between the circuit element layer 140 and the liquid crystal layer 300. The second polarizing coating layer 230B may be disposed between the second electrode 250 and the liquid crystal layer 300.

As described above, when the first polarizing coating layer 130B and the second polarizing coating layer 230B are disposed in the non-display area NDA, the light blocking layer may be omitted. Therefore, since the dead space can be minimized, the display device 1000B having the narrow bezel can be implemented.

In addition, when the first polarizing coating layer 130B is disposed to overlap the one end of the first polarizing plate 120, and the second polarizing coating layer 230B is disposed to overlap the one end of the second polarizing plate 220, the light L0 passing through the liquid crystal layer 300 and traveling to the non-display area NDA may be effectively blocked. Therefore, as described above, the viewing angle light leakage of the display device 1000B can be prevented or reduced.

In the display device according to the exemplary embodiments of the present invention, the dead space of the display device can be minimized by minimizing the light blocking layer.

In addition, since the polarizing coating layer is disposed to overlap the polarizing plate, the viewing angle light leakage of the display device can be prevented or reduced.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising: a first substrate including a display area and a non-display area; a second substrate disposed on the first substrate; a liquid crystal layer disposed between a first surface of the first substrate and a first surface of the second substrate; a first polarizing plate disposed on a second surface of the first substrate opposing the first surface of the first substrate and having a first end disposed inside a first end of the first substrate; a second polarizing plate disposed on a second surface of the second substrate opposing the first surface of the second substrate and having a first end disposed inside a first end of the second substrate; a first polarizing coating layer overlapping the first end of the first polarizing plate; and a second polarizing coating layer overlapping the first end of the second polarizing plate; wherein a first end of the first polarizing coating layer is disposed in the display area, and a second end of the first polarizing coating layer is aligned with a first end of the first substrate.

2. The display device of claim 1, wherein the first polarizing coating layer is disposed between the first substrate and the first polarizing plate.

3. The display device of claim 2, wherein the second polarizing coating layer is disposed between the second substrate and the second polarizing plate.

4. The display device of claim 1, wherein a first surface of the first polarizing coating layer is in contact with the first substrate, and a second surface opposing the first surface of the first polarizing coating layer is in contact with the first polarizing plate.

5. The display device of claim 1, wherein the first polarizing plate is in contact with the first substrate and the first polarizing coating layer.

6. The display device of claim 1, wherein the first polarizing plate directly covers a first end of the first polarizing coating layer.

7. The display device of claim 1, wherein the first polarizing coating layer and the second polarizing coating layer include the same material.

8. A display device comprising:
a first substrate including a display area and a non-display area;
a second substrate disposed on the first substrate;
a liquid crystal layer disposed between a first surface of the first substrate and a first surface of the second substrate;
a first polarizing plate disposed on a second surface of the first substrate opposing the first surface of the first substrate and having a first end disposed inside a first end of the first substrate;
a second polarizing plate disposed on a second surface of the second substrate opposing the first surface of the second substrate and having a first end disposed inside a first end of the second substrate;
a first polarizing coating layer overlapping the first end of the first polarizing plate; and
a second polarizing coating layer overlapping the first end of the second polarizing plate,
wherein a thickness of the first polarizing plate is greater than a thickness of the first polarizing coating layer.

9. The display device of claim 1, wherein the first polarizing coating layer is disposed between the first substrate and the liquid crystal layer.

10. The display device of claim 9, wherein the first polarizing coating layer is in direct contact with the first surface of the first substrate.

11. The display device of claim 9, wherein the second polarizing coating layer is disposed between the second substrate and the liquid crystal layer.

12. The display device of claim 1, further comprising: a color filter disposed in the display area.

13. The display device of claim 12, wherein the first end of the first polarizing coating layer and a first end of the second polarizing coating layer overlap the color filter.

14. The display device of claim 12, wherein the first polarizing coating layer is disposed at a same level as the color filter.

15. A display device comprising:
a first substrate including a display area and a non-display area;
a second substrate disposed on the first substrate;
a liquid crystal layer disposed between a first surface of the first substrate and a first surface of the second substrate;
a first polarizing plate disposed on a second surface of the first substrate opposing the first surface of the first substrate and having a first end disposed inside a first end of the first substrate;
a second polarizing plate disposed on a second surface of the second substrate opposing the first surface of the second substrate and having a first end disposed inside a first end of the second substrate;
a first polarizing coating layer overlapping the first end of the first polarizing plate;
a second polarizing coating layer overlapping the first end of the second polarizing plate; and
a light blocking layer disposed in the non-display area.

16. The display device of claim 15, wherein the first polarizing coating layer and the second polarizing coating layer overlap the light blocking layer.

17. The display device of claim 15, wherein the first end of the first polarizing plate and the first end of the second polarizing plate overlap the light blocking layer.

18. The display device of claim 15, wherein the light blocking layer is disposed between the second substrate and the liquid crystal layer.

19. The display device of claim 15, further comprising a color filter disposed in the display area,
wherein the light blocking layer is disposed at a same level as the color filter.

* * * * *